Figures 1, 2:
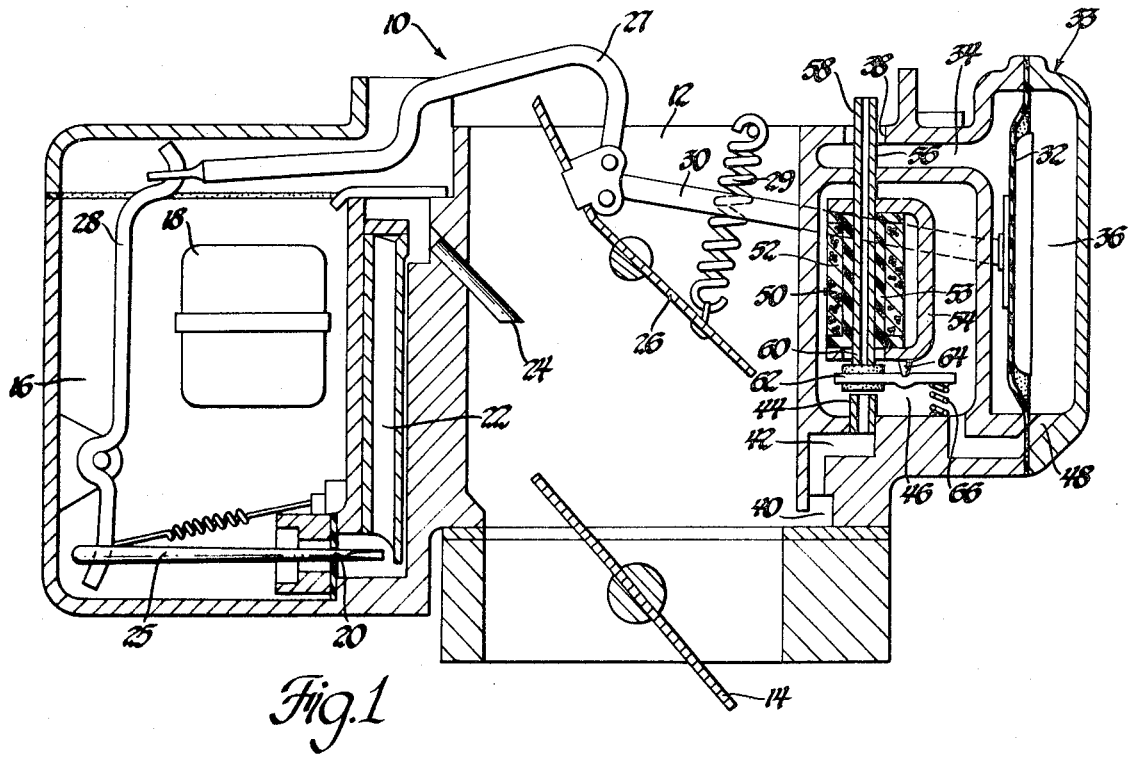

United States Patent [19]
Bedard et al.

[11] 3,754,540
[45] Aug. 28, 1973

[54] SPEED LIMITING MEANS FOR AN AIR VALVE CARBURETOR

[75] Inventors: Francis L. Bedard, Troy; Robert T. Price, Berkley, both of Mich.

[73] Assignee: General Motors Corporation, Detroit, Mich.

[22] Filed: Sept. 30, 1971

[21] Appl. No.: 185,283

[52] U.S. Cl. ............................................. 123/103
[51] Int. Cl. ............................................. F02d 11/08
[58] Field of Search .......................... 123/102, 103

[56] References Cited
UNITED STATES PATENTS

| | | | |
|---|---|---|---|
| 3,596,642 | 8/1971 | Nakata | 123/103 |
| 3,524,516 | 8/1970 | Bemmann | 123/103 X |
| 3,342,463 | 9/1967 | Date et al. | 123/103 X |
| 3,502,167 | 3/1970 | Baxter | 123/103 X |

*Primary Examiner*—Laurence M. Goodridge
*Attorney*—E. W. Christen, R. L. Phillips et al.

[57] ABSTRACT

An air valve upstream of a manually-controlled throttle valve, both pivotally disposed in a mixing conduit of an air valve carburetor, is linked to fuel metering means and also to a spring that biases the air valve to a normally closed position. The air valve is opened by a diaphragm-type fluid motor having a first pressure chamber communicating with a vacuum port intermediate the air valve and throttle valve through a vacuum passage and a second pressure chamber communicating with atmospheric pressure through an atmospheric passage. Below a predetermined vehicle speed, both chambers communicate continuously with their respective pressures with the result that the fluid motor positions the air valve in relation to the inducted air flow. Above this predetermined speed, the spring is allowed to close the air valve to a position where the air flow is limited to that required to maintain the predetermined speed. The rate of air valve closure is controlled by cooperation between the fluid motor and a solenoid valve intermittently operated by a vehicle speed sensor for duty cycles increasing as the actual vehicle speed exceeds the predetermined speed. The solenoid valve connects the first pressure chamber alternately between the atmospheric and vacuum passages for durations sufficient to effect a pressure increase in the pressure chamber that allows closure of the air valve at a rate to limit the vehicle speed.

3 Claims, 2 Drawing Figures

INVENTORS
Francis L. Bedard, &
BY Robert J. Price
Ronald L. Phillips
ATTORNEY

SPEED LIMITING MEANS FOR AN AIR VALVE CARBURETOR

This invention relates to air valve carburetors and more particularly to air valve carburetors providing vehicle speed limitations.

In an air valve carburetor, the fuel flow is controlled in accordance with the air flow by maintaining a pressure differential across a fuel metering orifice proportional to that across an air valve and by varying the area of the orifice with the area past the air valve. To effect this control, a fuel metering rod displaceable in the metering orifice is linked to and moved by the air valve. The air valve in turn is linked to a fluid motor having a pair of pressure chambers communicating through respective atmospheric and vacuum passages with the pressures upstream and downstream of the air valve and operative to open the air valve in relation to the pressure differential thereacross. The fuel flow is thereby controlled in accordance with the air flow to provide an air-fuel mixture suitable for internal combustion.

To limit to a predetermined vehicle speed the speed of a vehicle driven by an air-valve-type carburetor internal combustion engine, the present invention provides for the air valve to be biased from its opened position to a position at which the air flow is limited to effect the predetermined speed. Such limiting of air flow is effected by cooperation between the fluid motor and a solenoid valve. The latter is intermittently operated by a speed sensor for duty cycles increasing as the vehicle speed exceeds the predetermined speed. The solenoid valve connects a fluid motor pressure chamber normally connected to the vacuum passage alternately between the vacuum and atmospheric passages. The durations of such connections are sufficient to cause the pressure increase effected in the pressure chamber by connection to the atmospheric passage when the solenoid is deenergized to just exceed the pressure decrease pull down when connected to the vacuum port and thereby control the closure rate of the air valve.

It is therefore a primary object of the present invention to provide a new and improved automotive air valve carburetor for an internal combustion engine.

It is another primary object of the present invention to provide, in an air valve carburetor having a fluid motor for opening an air valve in accordance with the air flow thereacross, a vehicle speed limiter operative at a predetermined speed to limit air flow by allowing air valve closure.

It is another primary object of the present invention to provide, in an air valve carburetor, a fluid motor for positioning an air valve in accordance with the air flow thereacross, the fluid motor having one pressure chamber communicating with an atmospheric pressure passage upstream of the air valve and a second pressure chamber communicating through a vacuum passage to a vacuum port downstream of the air valve, and a speed limiter operative at a predetermined speed to permit closure of the air valve by connecting the pressure chamber normally connected with the vacuum passage alternately to the vacuum passage and the atmospheric passage.

It is a further and more specific object of the present invention to provide, in an air valve carburetor of the foregoing type, a solenoid valve intermittently operated by a speed sensor to alternately connect the atmospheric and vacuum passages to one of the fluid motor pressure chambers to control the closure rate of the air valve.

It is a further and more specific object of the present invention to operate a solenoid, in a speed limiter and an air valve carburetor of the foregoing type, at a duty cycle that causes the pressure increase in the pressure chamber when connected to the atmospheric passage to exceed the pressure decrease when connected to the vacuum passage.

These and other features, objects and details of the present invention will become more apparent with reference to the following description taken in conjunction with the following drawings, wherein:

FIG. 1 is a cross-sectional view of an air valve carburetor having a speed limiter constructed in accordance with the present invention; and, FIG. 2 is a schematic of an electromechanical speed sensor for operating the speed limiter in FIG. 1.

Referring now to FIG. 1, there is shown an air valve carburetor 10 for providing an air-fuel mixture to an internal combustion engine. Carburetor 10 has a mixing conduit 12, the flow of air through which is controlled by a throttle valve 14 pivotally disposed in conduit 12 and manually operated in the customary manner. Fuel 16 is delivered from a float bowl 18 to mixing conduit 12 through a metering orifice 20, a passage 22, and a nozzle 24, at a rate determined by the pressure differential across orifice 20, whose area is made variable by axial displacement therethrough of a tapered metering rod 25.

Also pivotally, and here centrally, disposed in mixing conduit 12 upstream of throttle valve 14 is a butterfly-type air valve 26 that is biased by a light spring 29 to close conduit 12 when the pressure drop across valve 26 is less than a few inches of water, here about 6 inches. Links 27 and 28 connect air valve 26 to metering rod 25 to increase fuel flow through orifice 20 by causing a leftward displacement of rod 25 as air valve 26 opens. Another link 30 connects air valve 26 to a flexible diaphragm 32 of a fluid motor 33 wherein diaphragm 32 is spaced between an air valve opening pressure chamber 34 and an air valve closing pressure chamber 36. Opening chamber 34 communicates with atmospheric pressure through an air passage or port 38, and closing chamber 36 normally communicates with a vacuum or signal port 40 located intermediate throttle valve 14 and air valve 26 in mixing conduit 12 through a vacuum or signal passage comprising conduit 42, a vacuum pipe 44, air-vacuum chamber 46, and a conduit 48.

Located within chamber 46 is a solenoid valve 50 comprising a coil 52 on a bobbin 53 secured around a vent pipe 56 secured in a frame 54 integral with and extending from a wall (not shown) of the carburetor. One end 58 of pipe 56 extends through air port 38 and the other end 60 is opposite and spaced from vacuum pipe 44. Located between vent pipe 56 and vacuum pipe 44 is a double-faced valve element 62 which is fulcrumed at projection 64 on the frame 54. Valve element 62 is the armature of the solenoid 50 and, when coil 52 is deenergized in speed limiting operation, is pivoted by a spring 66 to close vacuum pipe 44 and open vent pipe 56 to chamber 56 and thus to chamber 36. In non-speed limiting operation, coil 52 is energized so that valve element 62 normally closes vent pipe 56 and continually opens vacuum pipe 44.

Except for solenoid valve 50 and the inclusion of pipe 44 and chamber 46 in the signal passage, carburetor 10 is as shown and described in greater detail in U.S. Pat. No. 3,314,663, issued to Stanley H. Mick, and assigned to the assignee of the present invention.

In normal non-speed limiting operation with the solenoid valve 50 energized, the rate that air and fuel are admitted to and mixed in conduit 12 is determined by the setting of throttle valve 14 to effect the desired vehicle performance, and the pressure drop across orifice 20 is proportional to that across air valve 26. The fuel flow through orifice 20 is controlled in accordance with the air flow past air valve 26 by controlling the area of orifice 20 in accordance with the air valve position. Thus, as throttle valve 14 is opened to effect a desired level of vehicle performance, the flow of air-fuel mixture drawn through conduit 12 increases to momentarily increase the pressure drop across air valve 26. The decreased downstream signal pressure is communicated from vacuum port 40 to valve opening chamber 36 with valve 62 normally opening pipe 44. This momentarily increases the pressure differential acting on diaphragm 32 causing a force thereon to increase, through linkage 30, the opening of air valve 26 and also the flow area of orifice 20.

The spring rate and points of connection of valve closing spring 29 to air valve 26 are selected to provide a substantially constant closing torque on the air valve 26. This torque is selected to be small enough to be overcome by the air flow at idle operation and opposes an opening torque resulting from the pressure differential acting on diaphragm 32 in a stabilized throttle-load condition. When this pressure differential momentarily increases on throttle and/or load change, an opening torque greater than the closing torque is applied to air valve 26, causing air valve 26 to be opened to a position at which the pressure differential thereacross drops to where the two torques again balance.

An electromechanical speed sensor apparatus 70 for operating solenoid coil 52 is shown in FIG. 2 and here includes an input shaft 72 connected to be driven by a vehicle wheel (not shown) as by way of a flexible cable (not shown). An eccentric cam 73 is mounted on shaft 72 to impart oscillatory movement to a cam follower 74 pivoted on stationary and electrically isolated pins 75. At the other end of cam follower 74 is a contact arm 77 carrying an arcuate-shaped contact 76 for engaging a cantilevered or "dithering" contact 78. Such engagement is effected on contact 78 at a point thereon intermediate one end secured to a stationary support 80 and another end 81 which is free to contact speed control means to be described shortly.

Also secured to support 80 is a speed cup 82 containing a magnetic drag element 84 that rotates a field plate 85, and a spindle 86 connected thereto, in proportion to the speed of shaft 72 and against a return force applied by a coiled spring 88. Spindle 86 carries a speed indicator 90 for indicating speed on scale 92 and a contact interrupter pin 94 that is rotated clockwise with increasing vehicle speed.

Pin 94 is positioned on spindle 86 to commence intermittent contact with the free end 81 at a predetermined vehicle speed as contact 78 is being advanced and retracted relative to spindle 86 by cam contact 76. When interrupter pin 94 beings to intermittently contact dithering contact 78, the retraction thereof to follow cam contact 76 is prevented so that cam contact 76 leaves dithering contact 78 and does not resume contact again until the return advance stroke. Further clockwise rotation of interrupter pin 94 with increasing vehicle speed increases the proportion of the advancement and retraction oscillation period of cam follower 74 during which cam contact 76 leaves dithering contact 78. Except for the cooperation with fluid motor 33 and the electrical circuit to be described below, speed sensor 70 is as shown in greater detail in U.S. Pat. No. 3,601,104, issued Aug. 24, 1971, issued to Mark N. Culver and assigned to the assignee of the present invention.

The above-described interruption of mechanical contact between contacts 76 and 78 is used to deenergize solenoid coil 52, one end of which is connected to the positive terminal of vehicle battery 100 through the closure of a vehicle ignition switch 102. The negative terminal of battery 100 is connected to a point of constant reference potential such as support or ground 80. The other end of solenoid coil 52 is connected to the emitter of a PNP transistor 104, the collector of which is grounded at 80 and the base of which is connected between voltage dividing resistors 106 and 108. These resistors are connected in series between the positive terminal of battery 100 and ground 80 through ignition switch 102 and contacts 76 and 78.

Below the desired vehicle speed limit, contacts 76 and 78 are closed to complete a biasing circuit rendering transistor 104 conductive and causing sufficient emitter to collector current to flow therethrough to energize coil 52. As interrupter pin 94 enters the range of oscillatory motion of dithering contact 78 to interrupt contact with cam contact 76, as described above, the transistor 104 biasing path is interrupted for short periods during which current flow through transistor 104 and coil 52 is also interrupted. To protect transistor 104 against the effects of reverse voltages upon interruption of current flow therethrough, a diode 93 is connected from the collector to the emitter electrodes of transistor 104.

When contact interrupter pin 94 enters the range of oscillation of dithering contact 74, as has hereinabove been described, port 60 is opened and closed according to the operation of armature 62 attendant the energization and deenergization of coil 52. The periods that port 60 is opened are very short as pin 94 just enters the range of dithering contact 78 compared to the periods that port 60 is closed. This ratio, or duty cycle, between the opened and closed periods of the port 60 increases as vehicle speed increases to rotate interrupter pin 94 clockwise into the free end 81 of dithering contact 78. Depending on the range of advancing and retracting oscillation of the cam contact 76, a 100 percent duty cycle, effecting a continual opening of port 60, may be made to occur just above the predetermined speed limit, e. g. 1 or 2 miles per hour above this limit. This variation in duty cycle with speed effects a smooth transition from a non-limiting to a limiting control of vehicle speed, and the predetermined limit is not exceeded unless the throttle load or road load conditions are such as to effect vehicle acceleration through the desired speed limit. Only above the upper limit of this range does the limiting system allow closure of the air valve 26 by the action of the spring 29 that might be rapid enough to be appreciably noticed.

The opening of vent port 60 by armature 62 allows atmospheric air to pass into air vacuum chamber 46 and therefrom through conduit 48 into valve opening chamber 36. As soon as the pressure in chamber 36 is increased, the opening bias applied through link 30 to air valve 26 is decreased to allow closure thereof by spring 29 to effect a reduction in air flow and, thereby vehicle speed. A smooth transition from a condition where the system does not limit the speed to a condition where it does is effected by increasing the rate of air valve closure as the actual vehicle speed overshoots the predetermined limit. The closure rate of air valve 26 is determined by the magnitude of the torque unbalance thereon which in turn is determined by the pressure in pressure chamber 36. However, the pressure in chamber 36 does not increase instantaneously to atmospheric pressure when vent port 60 is opened by valve element 62. The pressure increases at a rate that depends on the duty cycle and on the sizes of the passages, conduits and chambers. The minimum rate of pressure increase is effected at a 0 percent duty cycle when vacuum pipe 44 is continually opened by valve element 62 and vent port 60 continually closed. As the duty cycle increases from 0 percent where there is no speed limiting, not only does the quantity of atmospheric air entering chambers 46 and 36 through vent port 60 increase, but also the offsetting effect of air from vacuum port 40 decreases. The maximum rate of pressure increase in chamber 36 effecting a maximum closure rate for air valve 26 is therefore effected at a 100 percent duty cycle.

Whenever the vehicle speed starts to exceed the predetermined speed at a slow rate, the response of the speed limiting system is such that a low duty cycle provided by interrupter pin 94 just entering the dithering range of contact 78 is sufficient to effect a slow closure of the air valve and a prompt return to the speed limit. As the rate that the vehicle speed overshoots the predetermined speed increases, the duty cycle is increased to compensate for the increased overshoot to where ultimately vent pipe 60 is continually open and vacuum pipe 44 continually closed.

Thus, by limiting the air flow to limit the vehicle speed to the predetermined speed, the air valve at or above the limiting speed essentially replaces the function performed by the throttle valve below the predetermined limiting speed. In other words, the cooperation between the vehicle speed sensor and the solenoid to control the rate of air valve closure to limit vehicle speed is analogous to the cooperation between the driver of the vehicle and the throttle valve to limit the speed at speeds below the predetermined limit.

Having described one embodiment of the present invention, it is understood that the specific terms and examples are employed in a descriptive sense only and not for the purpose of limitation. Other embodiments of the invention, modifications thereof, and alternatives thereto may be used. I therefore aim in the appended claims to cover such modification and changes as fall within the true scope and spirit of my invention.

What I claim as new and desire to secure by Letters Patent of the United States is:

1. An internal combustion engine air valve type carburetor comprising:
    a. a conduit for admitting and mixing air with fuel;
    b. manually controlled throttle valve for controlling the flow of air-fuel mixture to said engine;
    c. an air valve upstream of said throttle valve;
    d. fuel metering means connected with said air valve for controlling the flow of fuel with the position of said air valve;
    e. A first spring for uging said air valve from an open to a closed position to close off said air-fuel flow;
    f. fluid pressure operated motor means connected with said air valve and including a valve opening chamber and a valve closing chamber for urging said air valve toward said open position when the pressure in one of said opening and closing chambers increases relative to the pressure in the other of said chambers and allowing said first spring to close said air valve when the pressure in said one chamber decreases relative to that in the other;
    g. air passage means for communicating atmospheric pressure to one of said chambers;
    h. vacuum passage means for communicating the pressure in said conduit intermediate said air valve and said throttle valve to the other of said chambers;
    i. vehicle speed responsive motor control means for controlling said fluid motor including a speed responsive valve element for closing said vacuum passage means while connecting said air passage means to said other chamber above a predetermined vehicle speed; and
    j. a second spring for cooperating with said valve element to close said air passage means to said other chamber while opening said vacuum passage means below said predetermined speed.

2. An internal combustion engine air valve type carburetor comprising:
    a. a conduit for admitting and mixing air with fuel;
    b. a manually controlled throttle valve for controlling the flow of air-fuel mixture to said engine;
    c. an air valve upstream of said throttle valve;
    d. fuel metering means connected with said air valve for controlling the flow of fuel with the position of said air valve;
    e. a spring for urging said air valve from an open to a closed position to close off said air-fuel flow;
    f. fluid pressure operated motor means including a valve opening chamber and a valve closing chamber for urging said air valve toward said open position when the pressure in one of said opening and closing chambers increases relative to the pressure in the other of said chambers and allowing said spring to close said air valve when the pressure in one chamber decreases relative to the pressure in the other;
    g. air passage means for communicating atmospheric pressure to said one of said chambers;
    h. a vacuum passage for communicating the pressure in said conduit intermediate said air valve and said throttle valve to the other of said chambers;
    i. vehicle speed limiting means for increasing the pressure in said other chamber as vehicle speed increases above a predetermined speed, said limiting means including
        i. a valve armature element for alternately connecting said air passage means and said vacuum passage to said other chamber,
        ii. solenoid means operable between energized and deenergized states for causing said valve armature element to connect said air passage means to the other chamber when in one of said states and to connect the vacuum passage to the other chamber when in the other state, and iii. vehicle speed responsive switching circuit means for switching said solenoid between said states when the vehicle speed exceeds said predetermined speed and for increasing the duration of said one state relative to the duration of the other state with increasing vehicle speed past said predetermined speed.

3. An internal combustion engine air valve type carburetor comprising:
   a. a conduit for admitting and mixing air with fuel;
   b. a manually controlled throttle valve for controlling the flow of air-fuel mixture to said engine;
   c. an air valve upstream of said throttle valve;
   d. a fuel metering valve connected with said air valve for controlling the flow of fuel with the position of said air valve;
   e. a spring for urging said air valve from an open to a closed position to close off said air fuel flow;
   f. a fluid pressure operated motor including a housing, a diaphragm separating said housing into a valve opening chamber and a valve closing chamber and a linkage connecting said diaphragm to said air valve for urging said air valve toward said open position when the pressure in one of said opening and closing chambers increases relative to the pressure in the other of said chambers and allowing said spring to close said air valve when the pressure in one chamber decreases relative to the pressure in the other;
   g. an air passage for communicating atmospheric pressure to said one of said chambers;
   h. a vacuum passage for communicating the pressure in said conduit intermediate said air valve and said throttle valve to the other of said chambers;
   i. a vehicle speed responsive motor control for controlling said fluid motor to increase the pressure in said other chamber as vehicle speed increases above a predetermined speed, said control including a solenoid having a valve armature element for alternately connecting said air passage and said vacuum passage to said other chamber, said solenoid operable between energized and deenergized states for causing said valve armature element to connect said air passage to the other chamber when in said deenergized state and to connect the vacuum passage to the other chamber when in said energized state, and vehicle speed responsive switching circuit means including a switch for alternately energizing and deenergizing said solenoid to switch said solenoid between said states, said circuit means further including a switch control mechanism responsive to vehicle speed to control the opening and closing of said switch to increase the duration of said deenergized state relative to the duration of the energized state with increasing vehicle speed past said predetermined speed to effect a smooth transition of vehicle speed to said predetermined limit.

* * * * *